United States Patent
Reed et al.

[11] 3,889,224
[45] June 10, 1975

[54] CROWN FLOAT/DECELERATOR

[75] Inventors: Edgar A. Reed, Ambler; E. Russell Combos, Churchville, both of Pa.

[73] Assignee: The United States of America as represented by the Secretary of the Navy, Washington, D.C.

[22] Filed: Mar. 8, 1974

[21] Appl. No.: 449,295

[52] U.S. Cl. ................... 340/2; 9/8 R; 244/142; 244/145
[51] Int. Cl. .................................... B63b 21/52
[58] Field of Search ............... 340/2; 244/142, 145; 9/8 R

[56] References Cited
UNITED STATES PATENTS
| | | | |
|---|---|---|---|
| 3,104,856 | 9/1963 | Knack et al. | 244/145 |
| 3,161,896 | 12/1964 | Holt et al. | 9/8 R |
| 3,234,503 | 2/1966 | Wojciechowski et al. | 340/2 |
| 3,328,750 | 6/1967 | Gimber et al. | 340/2 |

*Primary Examiner*—Richard A. Farley
*Attorney, Agent, or Firm*—R. S. Sciascia; Henry Hansen; Aaron Nerenberg

[57] ABSTRACT

An air deployable ram-air inflatable bag is attached in the crown of a parachute or decelerator and separated therefrom by a fixed orifice. Upon descent, air is forced through the orifice inflating the bag while decelerating the downward velocity of a sonobuoy attached to the decelerator. Upon water entry, water flows into the bag, which is filled to approximately 60 to 90 per cent of its volume with air, through the orifice filling the remaining 10 to 40 per cent of volume. Water above the orifice acts as a seal or plug against the escape of trapped air from the bag during high frequency vertical oscillations in a static floating position.

6 Claims, 2 Drawing Figures

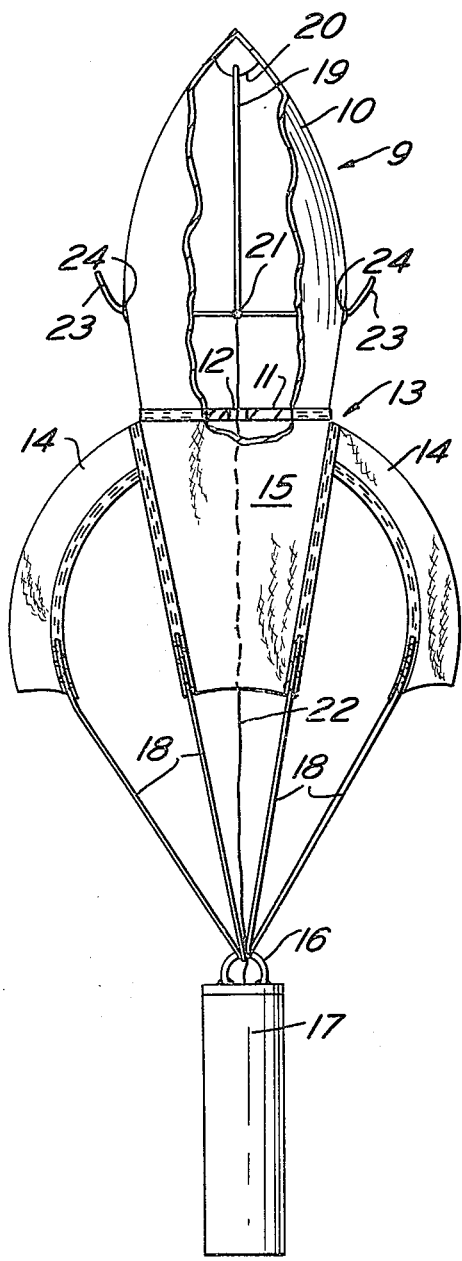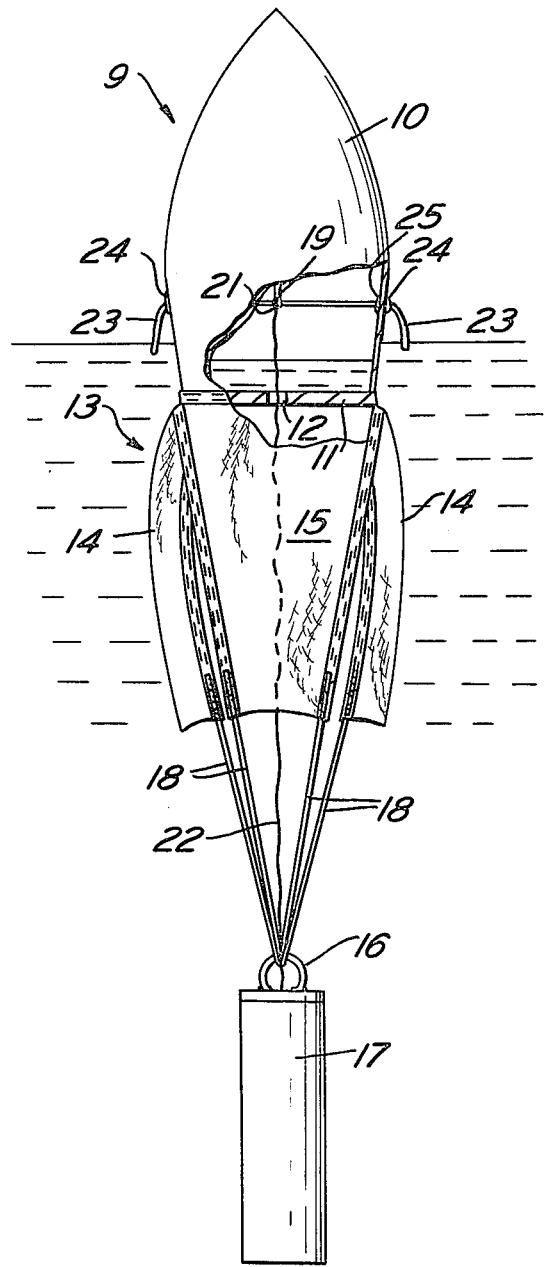

CROWN FLOAT/DECELERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of aeronautical safety lowering devices and more particularly to a parachute deceleration device and floatation platform for buoyantly supporting a sonobuoy.

In the air-to-sea launched, ram-air inflated floatation devices described in the prior art, several problems are encountered. Among them, sufficient air must be introduced into a floatation member in order to produce sufficient inflation to obtain maximum antenna erection within the member under the relatively low dynamic pressure of decelerated descent. Once inflated, air must be retained within the floatation member to maintain sufficient buoyancy to support the sonobuoy during deployment in the water. One device found in the prior art reveals ram-air inflatable apparatus in which the air opening is completely unrestricted, allowing a sufficient amount of air to enter and inflate the member. Another device provides a check valve between the air opening and the inflatable member for retaining air pressure therein once deployed in the water. Both types of apparatus present various problems. The open ended floatation device allows water to enter the bottom of the inflatable member, thus forming somewhat of a seal against the escape of air from the member when in a stationary floating position. However, during high vertical oscillations of the member, such as in heavy seas of the order of magnitude of International sea state 5, the water level within the member is allowed to fall below the air opening, allowing air to escape from the member and causing it to deflate. Normally, complete inflation must be maintained for holding an antenna erect within the floatation member. Deflation of the member causes incomplete antenna erection, resulting in poor radio reception and transmission, especially in high sea-state conditions. The latter floatation device, while restricting the escape of air from the inflatable member during high vertical oscillations, sometimes does not allow enough ram-forced air to enter the inflatable member during descent due to the restriction created by the check valve.

SUMMARY OF THE INVENTION

Accordingly, it is an object of the present invention to provide an improved, simple, reliable, lightweight, inexpensive, ram-air inflatable floatation and deceleration apparatus for aircraft-launched sonobuoys. It is another object of the invention to provide a ram-air inflatable floatation and deceleration apparatus which allows a sufficient amount of air to enter and inflate a member and provides superior retardation during descent. It is still a further object of the invention to provide a ram-air inflatable floatation and deceleration apparatus which remains fully inflated in the water during high vertical oscillations for long operating periods. Various other objects and advantages will appear from the following description of one embodiment of the invention, and the most novel features will be particularly pointed out hereinafter in connection with the appended claims.

These and other objects are accomplished according to the present invention by apparatus comprising an inflatable member having an orifice therethrough and a plurality of tapered, elongated members each attached at respective one ends to the inflatable member adjacent the orifice and at respective other ends to a plurality of shroud lines each connected at their respective other ends to a sonobuoy. Upon deployment from an aircraft, the tapered, elongated members fan out to form a parachute, scooping air into the inflatable member through the orifice while decelerating the downward descent of the sonobuoy. Upon water entry, entrapped air pressure is at a maximum in the inflated member and water enters the member through the orifice forming a layer which acts as a plug between the entrapped air and the orifice. Thus, high vertical oscillations will not cause the entrapped air to escape due to the relatively high density of the water layer between the entrapped air and the relatively small orifice.

BRIEF DESCRIPTION OF THE DRAWINGS

FIG. 1 is a partially cut away pictorial representation in elevation of one embodiment of the invention shown during descent; and FIG. 2 is a partially cut away pictorial representation in elevation of the embodiment of FIG. 1 resting in water at its normal floating position.

DESCRIPTION OF THE PREFERRED EMBODIMENT

FIG. 1 illustrates an embodiment of the present invention shown during free descent after being launched from an aircraft. A floatation unit 9 includes an inflatable, non-porous bag 10 having a nonpermeable bottom panel 11 attached to the open end of bag 10 with an orifice 12 therethrough. Floatation unit 9 is attached, such as by sewing to the crown portion of a decelerator or parachute 13 comprising transverse gores 14 and 15 which are constructed of a nonrigid fabric material. Bag 10 may be constructed of a heat sealable fabric such as polyurethane coated nylon, or any equivalent material. The parachute shown in the present preferred embodiment is a cross-type parachute, but it should be fully understood that any other type of parachute, for example, square, guide-surface, ribbon-type, or flat circular parachutes, could be used in the present invention with equally favorable results. When gores 14 and 15 are fully deployed during descent, parachute 13 provides the primary decelerating force, while bag 10 provides additional aerodynamic drag. The combination, thus produces overall superior aerodynamic performance in comparison with parachute performance alone. Drag area of the combined float/decelerator is increased to 5.8 square feet as compared with 4.8 square feet for the cross parachute alone. Accordingly, a typical drag coefficient of the present float/decelerator combination was measured at 0.85, compared to similarly measured drag coefficients ranging from 0.69 to 0.77 for the cross parachute alone. Inherent stability of the float/decelerator is also maintained during descent since the bulk of floatation bag 10 material trails decelerator 13. No unusual flow patterns are created to unstabilize the float/decelerator during descent, since floatation bag 10 does not extend into the captured air volume of decelerator 13. Gores 14 and 15 are respectively attached at their distal ends to a ring 16 on a sonobuoy 17 by a plurality of shroud lines 18 sewn or attached to the distal ends of gores 14 and 15 in some convenient manner. An antenna 19 is attached in some convenient manner to a ring 20 connected to the top of bag 10. Upon inflation of bag 10, ring 20 pulls antenna 19 to a fully erect position. Antenna 19 is electrically connected through a node 21 to sonobuoy 17 by a wire or cable 22, which may be a coaxial cable. A pair of ground plane antennas 23 are commonly connected to node 21 and extend in opposite directions through a pair of outer seals 24 on bag 10, to complete the electrical circuit, as will be more fully explained hereinafter.

Referring now to FIG. 2, floatation unit 9 is shown buoyantly supported in a body of water at its approximate floatation height with gores 14 and 15 dangling limply in the water supporting sonobuoy 17 by shroud lines 18. Antenna 19 must be fully extended in order to most efficiently transmit signal information from sonobuoy 17 to a monitoring aircraft overhead. Incomplete antenna erection results in poor radio reception and transmission especially during high sea-state conditions. Antennas 23, which extend from node 21 through seals 24 and 25 on bag 10 must be in contact with the water at all times during signal transmission and reception in order to complete the electrical circuit, and may be constructed from any conventional electrical conducting material. Seals 24 and 25 prevent the escape of air through the openings in the walls of bag 10, through which openings antennas 23 extend into the water. It is to be understood that any convenient method of retaining air within bag 10 could be similarly used. Antenna 19 must be long enough so that node 21 is always above the external water line while maintaining the respective ends of antennas 23 in contact with the water. It is noted that in the present preferred embodiment, the water line maintained within bag 10 is slightly below the external water line of the surrounding body of water.

Design parameters for a typical floatation unit will now be discussed for a sonobuoy weighing approximately 20–30 pounds. However, the same design principals can be applied for any type or weight of air-launched stores. The dimensions of bag 10 are chosen to accomodate both the necessary antenna size for effective radio transmission and reception, as well as the buoyancy required to support the weight of sonobuoy 17 and parachute assembly 13. In the present embodiment, the height of bag 10 is 20 inches tapering from the top point to a maximum diameter of 10 inches at panel 11, with an internal volume of 865 cubic inches. The size of orifice 12 is calculated to permit rapid bag inflation to approximately 60 to 90 per cent of total volume from a minimum altitude of 100 feet, while at the same time reducing the flow rate of water into and out of bag 10 while in a static floating position in order to fill up the remaining 10 to 40 per cent internal volume. It has been empirically determined that an orifice diameter of 1 inch is optimum for a sonobuoy in the design weight range, allowing slightly more than 1 inch of water to enter bag 10 above panel 11. As previously mentioned, it is important that the water level in bag 10 is below node 21 for maximum radio and transmission and reception efficiency. Therefore node 21 is typically located approximately 4 inches above panel 11.

Operation of the float/decelerator will now be described with reference to FIGS. 1 and 2. Upon deployment from an aircraft, parachute 13 opens, channeling air into the crown portion through metering orifice 12 at a rate approximately equal to that predicted by the continuity equation of fluid mechanics, filling bag 10 to approximately 90 per cent of its total expansible volume. As the sonobuoy enters the water with a relatively low hydroballistic impact load due to the lightweight construction of the float/decelerator, the already developed buoyancy and drag of the float/decelerator combine to prevent the system from being submerged and water pressure from collapsing the bag. Water enters bag 10 through orifice 12 filling the remaining approximately 10 per cent volume. The more dense layer of water between orifice 12 and the air in bag 10 acts as a plug to prevent the outflow of air during vertical oscillations due to rough sea conditions while floating in the water. Any external force on bag 10 must first force the higher density water through the metering orifice before any air can escape. The float/decelerator is therefore continuously maintained in an erect position providing a superior antenna platform for radio transmission and reception.

Having thus described the structure and operation of a preferred embodiment, some of the many advantages of applicants' present invention should now be readily apparent. The apparatus is simple, reliable, and economical, and is capable of being easily constructed from existing materials. Aerodynamic performance of the combined float and decelerator exceeds the performance of the parachute alone. Faster opening time of the parachute upon deployment is also achieved by maintaining the floatation bag aft of (above) the parachute. By permitting the parachute portion to inflate first, no severe shock loads are introduced by ram-air inflation of the floatation bag, thus obviating any structural upgrading of the shroud lines. The one-inch metering orifice in the floatation bag is an essentially cost-free feature which obviates any requirement for a check valve or other type of gas retention device. And finally, light weight construction is permitted by the relatively low hydroballistic loads produced upon water impact.

Obviously, many modifications and variations of the present invention are possible in light of the above teachings. It is therefore to be understood that within the scope of the appended claims, the invention may be practiced otherwise than as specifically described.

What is claimed is:

1. An entrapped air floatation device for deployment of a non-buoyant object from an elevated position in air into a body of water, comprising in combination:

an inflatable member formed to dependingly support the object and having an orifice positioned therein for restricting fluid flow out of said member, for allowing sufficient air into said member during descent from the elevated position to provide adequate buoyancy for the object, and for allowing water into said member thereafter, said orifice being positioned below the airwater interface after the device reaches a floating position in the water; whereby the air pressure attained in said member is prevented from escaping through said orifice in high sea states by the water above said orifice.

2. A floatation device as set forth in claim 1 further comprising:

parachute means centrally and contiguously attached to said member around said orifice for funneling ram air therethrough and for decelerating the descent.

3. A floatation device as set forth in claim 2 wherein said parachute means further comprises:
a plurality of flexible members, each having a generally elongated, tapered shape and each operatively attached at their respective wider ends proximate oppositely facing surfaces of said orifice.

4. A floatation device as set forth in claim 1 further comprising:
said orifice having a diameter of approximately one-tenth the diameter of said inflatable member adjacent said orifice.

5. A floatation device as set forth in claim 1 wherein said inflatable member further comprises:
a generally spheroconical shaped body portion having said orifice in the base thereof.

6. A floatation device as set forth in claim 5 further comprising:
antenna means operatively attached within said inflatable member adjacent the apex of said body portion and electrically connected to the object and, capable of becoming fully erect upon inflation of said member for transmitting and receiving signals.

* * * * *

UNITED STATES PATENT OFFICE
CERTIFICATE OF CORRECTION

Patent No. 3,889,224                   Dated   July 15, 1975

Inventor(s)   Edgar A. Reed, 3rd  and  E. Russell Gombos

It is certified that error appears in the above-identified patent and that said Letters Patent are hereby corrected as shown below:

On the front page, data element identifier:

[75] Inventors:  Edgar A. Reed, Ambler; E. Russell
                 Gombos, Churchville, both of Pa.

should read

[75] Inventors:  Edgar A. Reed, 3rd, Ambler; E. Russell
                 Gombos, Churchville, both of Pa.

*Signed and Sealed this*

*sixteenth* Day of *September 1975*

[SEAL]

Attest:

RUTH C. MASON
*Attesting Officer*

C. MARSHALL DANN
*Commissioner of Patents and Trademarks*